US011741852B2

(12) United States Patent
Göçülü et al.

(10) Patent No.: US 11,741,852 B2
(45) Date of Patent: Aug. 29, 2023

(54) SMART READING ASSISTANT

(71) Applicant: KYNDRYL, INC., New York, NY (US)

(72) Inventors: Hasibe Göçülü, Dublin (IE); Thomas Brackhahn, Eschborn (DE); Clea Zolotow, Key West, FL (US); John Graham, Ryde (GB); Saritha Route, Bangalore (IN); Pedro Soares, Silveira (PT)

(73) Assignee: KYNDRYL, INC., New York, NY (US)

( * ) Notice: Subject to any disclaimer, the term of this patent is extended or adjusted under 35 U.S.C. 154(b) by 190 days.

(21) Appl. No.: 17/102,887

(22) Filed: Nov. 24, 2020

(65) Prior Publication Data
US 2022/0165178 A1 May 26, 2022

(51) Int. Cl.
G09B 19/06 (2006.01)
G06F 40/263 (2020.01)
G06N 20/00 (2019.01)
G06F 3/0483 (2013.01)
G06F 3/01 (2006.01)
G06F 40/30 (2020.01)

(52) U.S. Cl.
CPC ............. G09B 19/06 (2013.01); G06F 3/013 (2013.01); G06F 3/0483 (2013.01); G06F 40/263 (2020.01); G06F 40/30 (2020.01); G06N 20/00 (2019.01)

(58) Field of Classification Search
None
See application file for complete search history.

(56) References Cited

U.S. PATENT DOCUMENTS

| 8,602,789 | B2  |   | 12/2013 | Hallowell |            |
|-----------|-----|---|---------|-----------|------------|
| 9,256,784 | B1  | * | 2/2016  | Taylor    | G06F 3/0483 |
| 9,336,204 | B1  | * | 5/2016  | Amundsen  | G06F 40/40 |
| 9,478,143 | B1  |   | 10/2016 | Bowen     |            |
| 9,680,945 | B1  | * | 6/2017  | Treves    | H04W 4/21  |
| 10,417,933| B1  | * | 9/2019  | Yu        | G09B 19/06 |

(Continued)

FOREIGN PATENT DOCUMENTS

JP 2018054638 A 4/2018

OTHER PUBLICATIONS

Hua Wu et al ,Synonymous Collocation Extraction Using Translation Information, Jul. 2003 (Year: 2003).*

(Continued)

*Primary Examiner* — Howard Cortes
(74) *Attorney, Agent, or Firm* — Zilka-Kotab, P.C.

(57) ABSTRACT

In an approach for a smart reading assistant that helps users learn to read a new language, a processor detects a language of a digital book opening by a user on a computing device. A processor identifies a user reading capability level for the language of the digital book from a user profile for the user. A processor inputs at least one in context meaning of potential unknown words based on the user reading capability level. A processor detects a user action by the user on the computing device. A processor updates the user reading capability level based on the user action. A processor identifies, using collocation extraction, related words to a word involved in the user action. A processor inputs at least one in context meaning of at least one of the related words.

19 Claims, 5 Drawing Sheets

(56) References Cited

U.S. PATENT DOCUMENTS

| | | | | |
|---|---|---|---|---|
| 10,902,395 | B1* | 1/2021 | Knas | G06F 16/9038 |
| 11,024,199 | B1* | 6/2021 | Treves | G09B 5/02 |
| 2005/0125215 | A1* | 6/2005 | Wu | G06F 40/284 |
| | | | | 704/1 |
| 2014/0234826 | A1* | 8/2014 | Breznitz | G09B 7/00 |
| | | | | 434/362 |
| 2014/0372429 | A1* | 12/2014 | Ziklik | G06Q 30/0282 |
| | | | | 707/736 |
| 2015/0149429 | A1* | 5/2015 | Chilakamarri | G06F 9/453 |
| | | | | 707/706 |
| 2016/0309998 | A1* | 10/2016 | Gonzalez Garcia | A61B 3/111 |
| 2017/0060842 | A1* | 3/2017 | Dwarakanath | G06F 40/289 |
| 2017/0132205 | A1* | 5/2017 | Novitskiy | G06F 40/284 |
| 2017/0132208 | A1* | 5/2017 | Adavelli | G06F 40/151 |
| 2017/0186338 | A1* | 6/2017 | Treves | G09B 5/06 |
| 2017/0344530 | A1* | 11/2017 | Krasadakis | G06F 3/0483 |
| 2018/0315131 | A1* | 11/2018 | Peh | G06Q 40/123 |
| 2019/0080623 | A1 | 3/2019 | Berzak | |
| 2019/0243848 | A1 | 8/2019 | Fu | |
| 2020/0098283 | A1* | 3/2020 | Vaculin | G06F 40/295 |

OTHER PUBLICATIONS

Madori Ikeda et al, Extending Various Thesauri by Finding Synonym Sets from a Formal Concept Lattice, 2017 (Year: 2017).*

Anonymous et al., "Eye Tracking", Wikipedia, Aug. 25, 2020, 19 Pages.

Gagliordi, Natalie, "How Duolingo uses AI to disrupt the language learning market", ZDNet, Between the Lines, Nov. 13, 2018, 16 Pages.

Lisoveis, Volodymyr, "Essentials of Artificial Intelligence for Language Learning", Intellias Blog, Dec. 21, 2017, 11 Pages.

Lotze, Netaya, "Artificial Intelligence in Language Learning", Goethe-Institut, Germany, May 2018, 5 Pages.

Rutkin, Aviva, "Digital textbooks adapt to your level as you learn", NewScientist, Technology, Aug. 20, 2014, 6 Pages.

Utermohlen, Karl, "4 Ways AI is Changing the Education Industry", Towards Data Science, Medium, Apr. 12, 2018, 5 Pages.

Waters, John, "AI Is Everywhere. Now It Wants to Teach You Chinese", EdSurge News, May 3, 2019, 6 Pages.

Weber, Gerhard, "Episodic Learner Modeling", Cognitive Science, vol. 20, Issue 2, pp. 195-236, Apr.-Jun. 1996, 42 Pages.

* cited by examiner

SMART READING ASSISTANT

BACKGROUND OF THE INVENTION

The present invention relates generally to the field of data processing, and more particularly to a smart reading assistant for helping users to read a book in a foreign language.

SUMMARY

Aspects of an embodiment of the present invention disclose a method, computer program product, and computer system for a smart reading assistant. A processor detects a language of a digital book opening by a user on a computing device. A processor identifies a user reading capability level for the language of the digital book from a user profile for the user. A processor inputs at least one in context meaning of potential unknown words based on the user reading capability level. A processor detects a user action by the user on the computing device. A processor updates the user reading capability level based on the user action. A processor identifies, using collocation extraction, related words to a word involved in the user action. A processor inputs at least one in context meaning of at least one of the related words.

In some aspects of an embodiment of the present invention, the user action could be the user clicking on the word to enable a meaning, the user clicking on the word to disable the meaning, the user pausing over a section of the current page for more than a pre-defined threshold of time, and/or the user rereading a sentence of the current page more than a second pre-defined threshold amount of times.

In some aspects of an embodiment of the present invention, a processor determines whether the user has paused over the section of the current page for more than the pre-defined threshold of time or the user has reread the sentence of the current page more than the second pre-defined threshold amount of times based on eye tracking technology.

In some aspects of an embodiment of the present invention, a processor requests a native language and reading capability level for one or more foreign languages from the user. A processor receives the native language and the reading capability level for the one or more foreign languages from the user. A processor stores the native language and the reading capability level for the one or more foreign languages in the user profile.

In some aspects of an embodiment of the present invention, a processor identifies, using collocation extraction, the related words to the word involved in the user action by creating buckets of words that are related to the word for different contexts using an algebraic lattice and identifying, from the buckets of words, the related words that are in the same context as the word.

In some aspects of an embodiment of the present invention, the at least one in context meaning of potential unknown words and of the at least one of the related words is input in line with text of a current page of the digital book displayed on the computing device.

In some aspects of an embodiment of the present invention, a processor outputs a learning activity to the user through a user interface of the computing device based on the related words.

DETAILED DESCRIPTION

Figure 1:
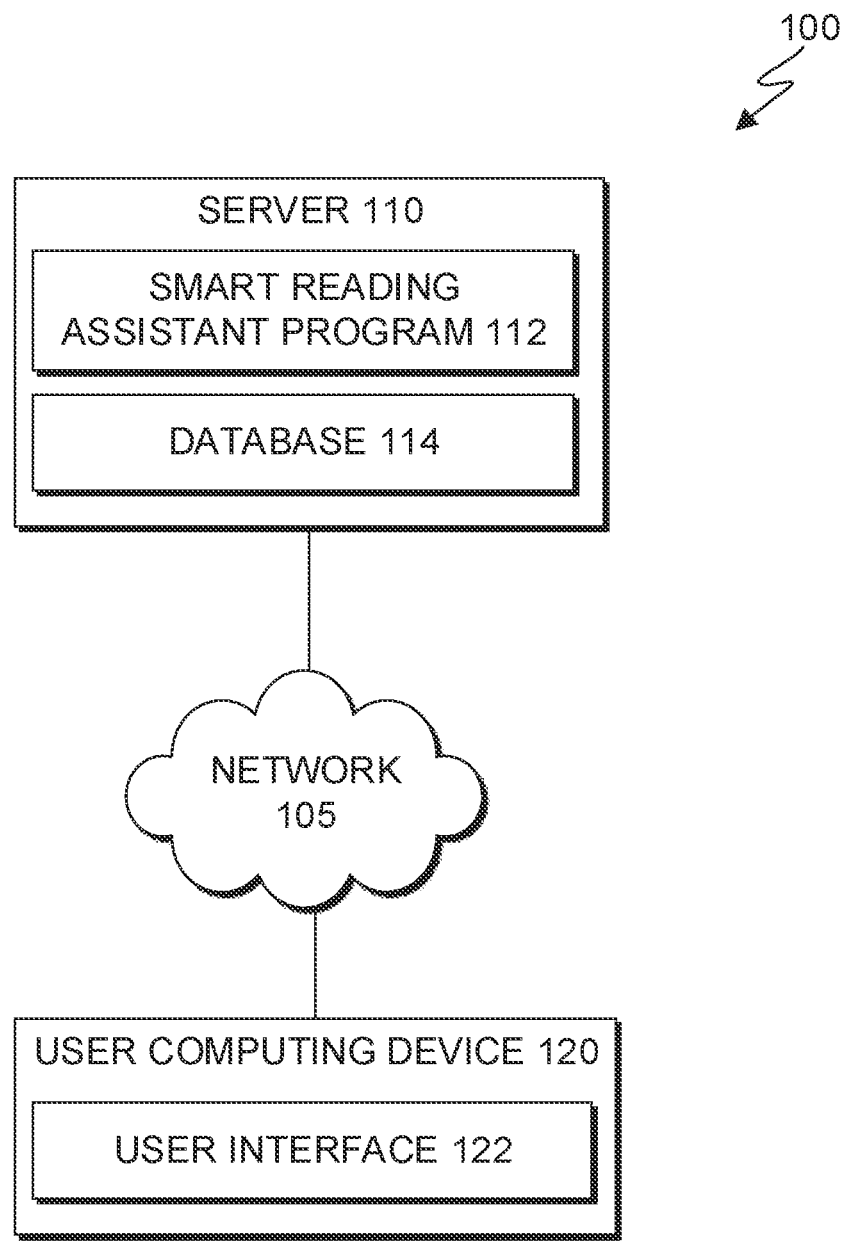
FIG. 1 is a functional block diagram illustrating a distributed data processing environment, in accordance with an embodiment of the present invention.

Embodiments of the present invention recognize that reading in a language that a person is not proficient in requires the person to learn what the words individually mean, how those words are used grammatically in sentences, and how those words are used in context. As a person reads a book in a foreign language, for example, either in physical or digital (i.e., e-book) form, the person can look up the definition or translation of an unknown word using a physical dictionary, a dictionary or translation feature on an e-reader, or a dictionary or translation website. Having to stop and look up the unknown word, even if just by tapping down on the word on a screen on an e-reader to use a dictionary feature of the e-reader, inhibits the reading experience of the user. Additionally, if there are multiple definitions or uses for the unknown word in different contexts, the user has to determine which definition or use is correct within the context of the sentence or paragraph. Idioms are especially difficult to determine a correct meaning for and using a dictionary in the context of idioms can be confusing and unhelpful.

There are multiple known applications for learning a foreign language, but they focus on using repetition, reminding words, and/or grammar topics to assist a person learn the foreign language. Reading in a foreign language can be very helpful in becoming proficient in the foreign language because it exposes to reader to more words, sentence structures, idioms, etc. Therefore, embodiments of the present invention recognize the need for a language learning method that focuses on assisting persons learning a new language through reading of books, periodicals, etc.

Embodiments of the present invention provide a program that assists users in reading and understanding text, e.g., of an e-book, on a computing device in a smoother way without use of a dictionary or translator. Embodiments of the present invention dynamically learn the user's reading capability level and enhance their reading experience by feeding the meanings of words, within the context, in line with the text to expedite their learning of the language. Essentially, embodiments of the present invention provide in context meanings of predicted unknown words, based on a user's reading capability level, instead of a basic translation or definition of each unknown word, which might not provide the correct meaning or usage of the unknown word.

Embodiments of the present invention utilize artificial intelligence (AI) and machine-learning to calculate a user's reading capability level dynamically and provide necessary meanings of words according to the user's reading capability level. An in context meaning of a word provided is based on the meaning of the word in the context of the sentence and/or paragraph the word is in. The user will be able to enable/ disable meaning of the words which will be a critical input for the AI component to further evaluate the user's reading capability level. Embodiments of the present invention further utilize an eye-tracker to determine the user's reading pace and identify words and/or passages the user is having difficulty with. Embodiments of the present invention further utilize the data collected by the eye-tracker as inputs to the AI and machine-learning component to determine the user's reading capability level. The AI and machine-learning components output determined meanings of words based on the user's reading capability level and the outputs are automatically input in-line in the original text.

Embodiments of the present invention utilize AI and machine-learning to not only identify individual words that the user needs help with but also to classify the identified words by their relevance and perform collocation extraction, i.e., identify other related words within the context. Embodiments of the present invention use the identified words and extracted related words to predict later in the book additional words the user may also need the meanings of. Additionally, embodiments of the present invention perform collocation extraction to create a "bucket of words", which includes words related to the original identified words that the user most likely will want the meanings of. The collocation extraction to identify related words helps a user to learn similar words within the same context.

Embodiments of the present invention dynamically update the user's reading capability level based on the reading pace of the user determined through an eye-tracker and meanings of words enabled/disabled by the user as they are reading. Embodiments of the present invention automatically reduce the number of word meanings provided as the user's reading capability level increases.

Embodiments of the present invention recognize two main uses cases for the smart reading assistant program. In a first use case, a person trying to learn a foreign language can utilize the smart reading assistant program to help them read and understand text in a foreign language without needing a dictionary. In a second use case, a young person learning to read their native language for the first time can utilize the smart reading assistant program to help them read and understand text and even enable them to read more complex writings. In this second use case, the smart reading assistant program can also substitute unknown words with images.

Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110 and user computing device 120, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, user computing device 120, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with user computing device 120, and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes smart reading assistant program 112 and database 114. Server 110 may include internal and external hardware components, as depicted and described in further detail with respect to FIG. 5.

Smart reading assistant program 112 operates to assist a user reading in a foreign language or learning to read in their native language by dynamically learning the user's reading capability level and adding, directly in line with the text, in context meanings of determined unknown words to expedite learning of the language. In the depicted embodiment, smart reading assistant program 112 is a standalone program. In another embodiment smart reading assistant program 112 may be integrated into another software product, such as an e-reader software package. In an embodiment, users opt-in to the use of smart reading assistant program 112 and set up a user profile with smart reading assistant program 112. The setup component of smart reading assistant program 112 is depicted and described in further detail with respect to FIG. 2. The main function of smart reading assistant program 112, dynamically learning the user's reading capability level and adding, directly in line with the text, in context meanings of determined unknown words to expedite learning of the language, is depicted and described in further detail with respect to FIG. 3.

Database 114 operates as a repository for data received, used, and/or output by smart reading assistant program 112. Data received, used, and/or generated may include, but is not limited to, a plurality of user profiles with user profile information input by a user during the setup component described in FIG. 2; and any other data received, used, and/or output by smart reading assistant program 112. Database 114 can be implemented with any type of storage device capable of storing data and configuration files that can be accessed and utilized by server 110, such as a hard disk drive, a database server, or a flash memory. In an embodiment, database 114 is accessed by smart reading assistant program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that smart reading assistant program 112 has access to database 114.

The present invention may contain various accessible data sources, such as database 114, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Smart reading assistant program 112 enables the authorized and secure processing of personal data.

Smart reading assistant program 112 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Smart reading assistant program 112 provides information regarding personal and/or confidential company data and the nature (e.g., type, scope, purpose, duration, etc.) of the processing. Smart reading assistant program 112 provides the user with copies of stored personal and/or confidential company data. Smart reading assistant program 112 allows the correction or completion of incorrect or incomplete personal and/or confidential company data. Smart reading assistant program 112 allows for the immediate deletion of personal and/or confidential company data.

User computing device 120 operates as a computing device associated with a user on which the user can read a book, article, periodical, etc. and can opt-in to smart reading assistant program 112 through an application user interface. In the depicted embodiment, user computing device 120 includes an instance of user interface 122. In an embodiment, user computing device 120 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 120 represents one or more programmable electronic devices or combination of programmable electronic devices capable of executing machine readable program instructions and communicating with other computing devices (not shown) within distributed data processing environment 100 via a network, such as network 105. User computing device 120 may include internal and external hardware components, as depicted and described in further detail with respect to FIG. 5.

User interface 122 provides an interface between smart reading assistant program 112 on server 110 and a user of user computing device 120. In one embodiment, user interface 122 is a mobile application software. Mobile application software, or an "app," is a computer program designed to run on smart phones, tablet computers, and other mobile computing devices. In one embodiment, user interface 122 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 122 enables a user of user computing device 120 to create a user profile for smart reading assistant program 112, in which the user can input the user's native language and current reading capability level for one or more foreign languages. Further, user interface 122 enables a user of user computing device 120 to opt-in or opt-out of smart reading assistant program 112.

Figure 2:
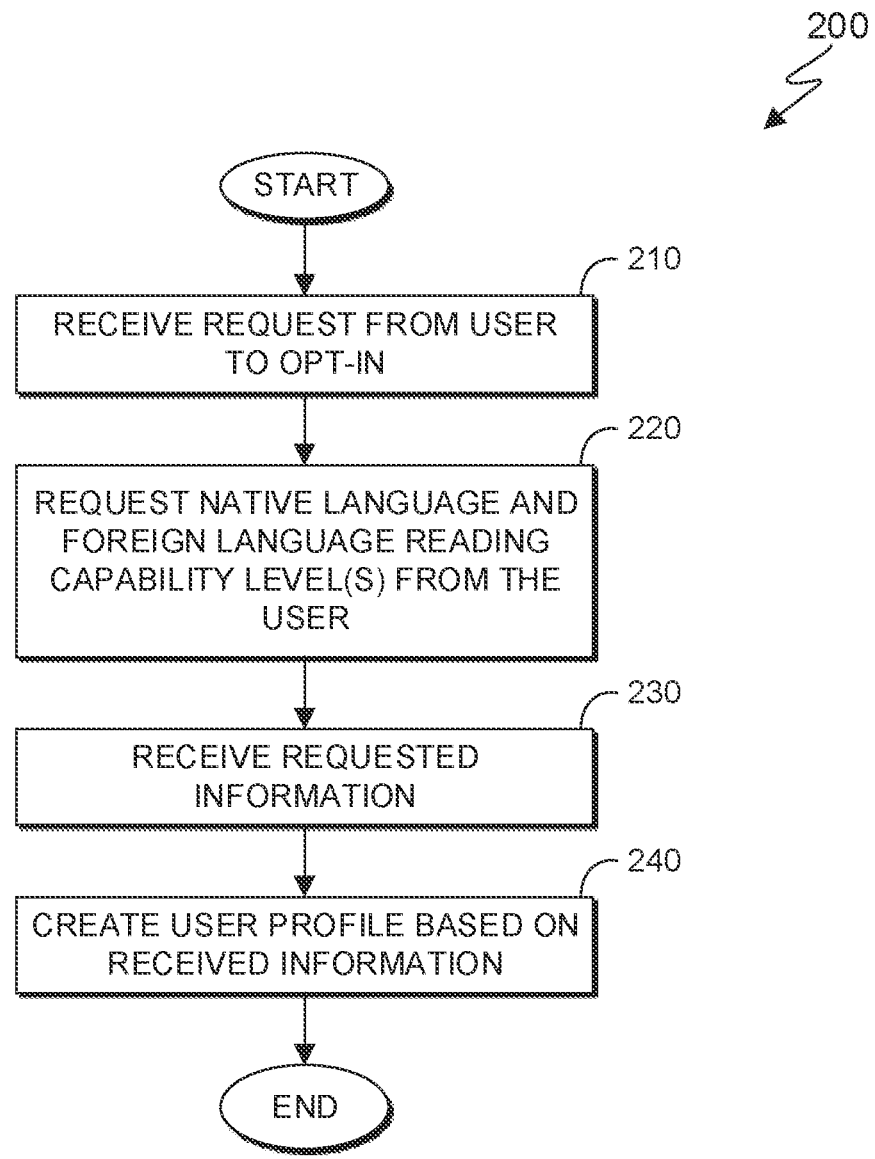
FIG. 2 is a flowchart depicting operational steps of a setup component of a smart reading assistant program, in accordance with an embodiment of the present invention.

FIG. 2 is a flowchart 200 depicting operational steps of a setup component of smart reading assistant program 112, on server 110 within distributed data processing environment 100 of FIG. 1, in accordance with an embodiment of the present invention. In an embodiment, smart reading assistant program 112 completes a one-time setup with a user to create a user profile with smart reading assistant program 112 for the user. The one-time setup allows smart reading assistant program 112 to establish the user's native language and baseline reading capability level from which smart reading assistant program 112 can dynamically update and provide in context meanings of predicted unknown words based on the user's reading capability level as described in more detail with respect to FIG. 3. It should be appreciated that the process depicted in FIG. 2 illustrates one possible iteration of smart reading assistant program 112, which may be repeated for each opt-in request received by smart reading assistant program 112.

In step 210, smart reading assistant program 112 receives a request from a user to opt-in. In an embodiment, smart reading assistant program 112 receives a request from a user to opt-into smart reading assistant program 112. For example, a user, who has just turned on a newly bought e-reader, can opt-in to smart reading assistant program 112 by checking an opt-in box through a user interface on the e-reader.

In step 220, smart reading assistant program 112 requests the user's native language and reading capability level(s) for one or more foreign languages from the user. In an embodiment, smart reading assistant program 112 requests, from the user, the user's native language and reading capability level(s) for one or more foreign languages to use as baseline reading capability level(s) for the user. For example, smart reading assistant program 112 prompts the user to input the user's native language and reading capability level(s) for one or more foreign languages through a user interface of an e-reader device. In an embodiment, responsive to smart reading assistant program 112 receiving the request from the user to opt-in, smart reading assistant program 112 requests the user's native language and reading capability level(s) for one or more foreign languages from the user.

In some embodiments, smart reading assistant program 112 provides pre-set levels for the user to select from when selecting the user's reading capability level(s) for one or more foreign languages. For example, smart reading assistant program 112 enables the user to select between beginner, intermediate, and proficient levels. In another example, smart reading assistant program 112 enables the user to input how many years or a number of writings previously read by the user in a respective foreign language to determine a baseline reading capability level of the user.

In an embodiment in which a person is using smart reading assistant program 112 to learn to read in their native language, smart reading assistant program 112 provides pre-set levels for the user to select from when selecting the user's reading capability level for the native language. For example, smart reading assistant program 112 enables the user to select between beginner, intermediate, and proficient levels. In another example, smart reading assistant program 112 enables the user to input how many years, a standard reading level the user is at (e.g., a reading grade level based on a National Assessment of Educational Progress (NAEP) reading assessment), or a number of writings previously read by the user in the native language to determine a baseline reading capability level of the user.

In step 230, smart reading assistant program 112 receives the requested user's native language and reading capability level(s) for one or more foreign languages from the user. In an embodiment, smart reading assistant program 112 receives the requested user's native language and reading capability level(s) for one or more foreign languages from the user through a user computing device. In an embodiment, responsive to smart reading assistant program 112 requesting information from the user, smart reading assistant program 112 receives the requested user's native language and reading capability level(s) for one or more foreign languages from the user.

In step 240, smart reading assistant program 112 creates a user profile based on the received information. In an embodiment, smart reading assistant program 112 creates a user profile for the user and includes the user's native language and reading capability level(s) for one or more foreign languages. In an embodiment, smart reading assistant program 112 stores the user profile and/or the user's native language and reading capability level(s) for one or more foreign languages in a database, e.g., database 114. Based on the received reading capability level(s) for one or more foreign languages, smart reading assistant program 112 sets a baseline reading capability level for the user for the one or more foreign languages. In an embodiment, responsive to smart reading assistant program 112 receiving the requested information from the user, smart reading assistant program 112 creates the user profile based on the received information.

In some embodiments, smart reading assistant program 112 requests from the user a standard reading capability level to set for one or more foreign languages not pre-set by the user. In these embodiments, smart reading assistant program 112 pre-sets the reading capability level for any foreign languages not pre-set by the user to a "beginner" or lowest reading capability level until changed by the user or the user reads an e-book in that language that smart reading assistant program 112 can gather data about the user's reading capability level based on actions and/or interactions by the user.

Figure 3:
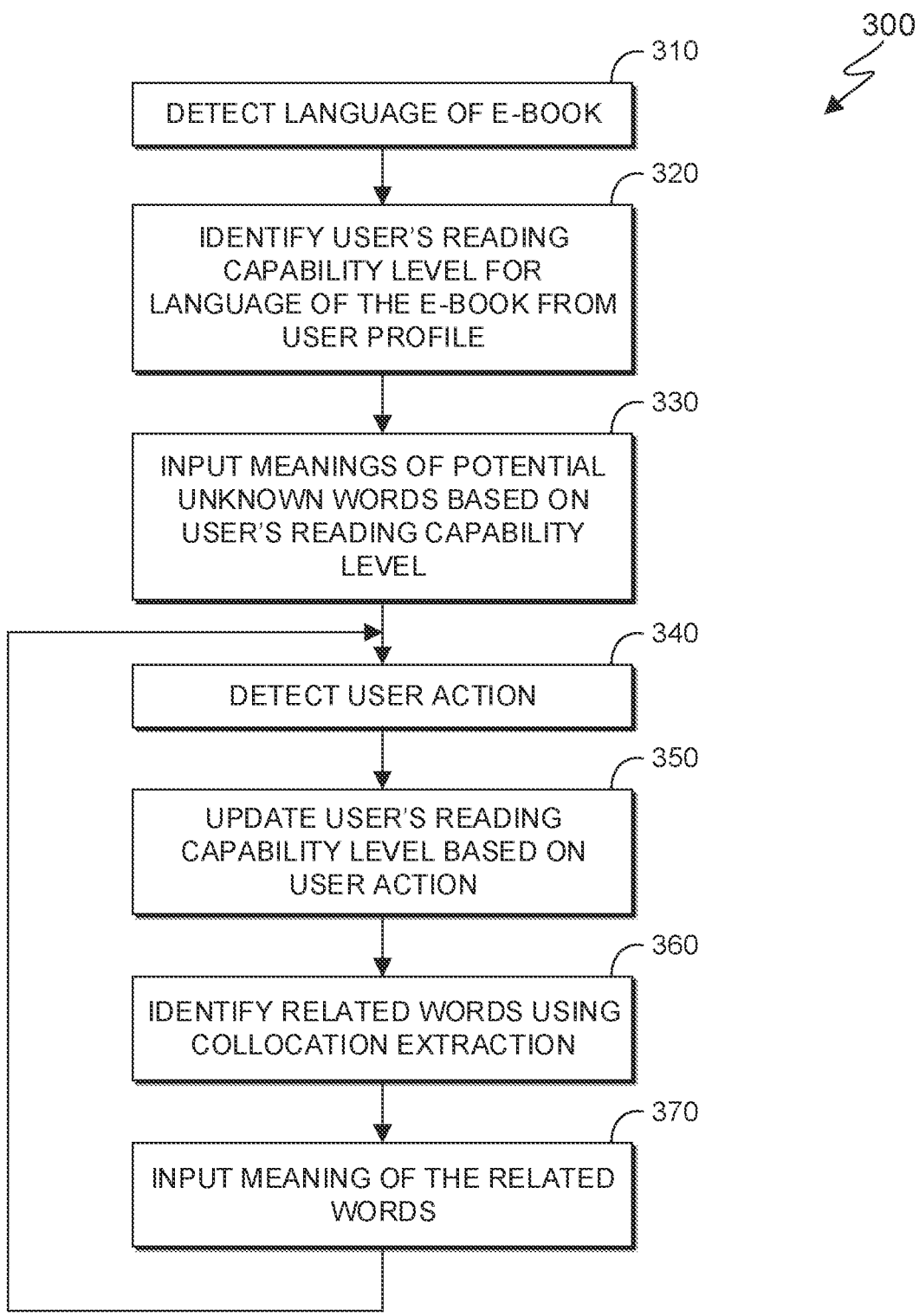
FIG. 3 is a flowchart depicting operational steps of the smart reading assistant program, for helping users read digital text in a new language, in accordance with an embodiment of the present invention.

FIG. 3 is a flowchart 300 depicting operational steps of smart reading assistant program 112, for dynamically learning the user's reading capability level and adding, directly in line with the text, in context meanings of determined unknown words to expedite learning of the language, in accordance with an embodiment of the present invention. It should be appreciated that the process depicted in FIG. 3 illustrates one possible iteration of smart reading assistant program 112, which initiates each time the user opens an e-book to read.

In step 310, smart reading assistant program 112 detects a language of an e-book. In an embodiment, smart reading assistant program 112 detects the language of the e-book opened by the user. In an embodiment, responsive to the user opening an e-book on a computing device, smart reading assistant program 112 automatically detects the language of the e-book.

In step 320, smart reading assistant program 112 identifies the user's reading capability level for the language of the e-book from a user profile. In an embodiment, smart reading assistant program 112 looks to the user profile for the user to see if there is a reading capability level stored for the language of the e-book. In an embodiment, smart reading assistant program 112 finds the user profile for the user stored in a database, e.g., database 114, accessible by smart reading assistant program 112. In an embodiment, responsive to detecting the language of the e-book, smart reading assistant program 112 identifies the user's reading capability level for the language of the e-book from the user profile.

In an embodiment in which the user does not have a stored reading capability level for the language of the e-book, smart reading assistant program 112 prompts the user to input or set a reading capability level for the language. For example, smart reading assistant program 112 detected the language of the e-book to be Turkish, and upon checking the user profile for the user, smart reading assistant program 112 did not find a stored reading capability level for Turkish, so smart reading assistant program 112 prompts the user with a pop-up asking for the user to input a reading capability level for Turkish. In other embodiments in which the user does not have a stored reading capability level for the language of the e-book, smart reading assistant program 112 uses the pre-set "beginner" or lowest reading capability level.

In step 330, smart reading assistant program 112 inputs meanings of potential unknown words based on the user's reading capability level. In an embodiment, smart reading assistant program 112 inputs, directly in line with text, meanings of potential unknown words based on the user's reading capability level. In an embodiment, smart reading assistant program 112 scans a page of the e-book that the user is currently on for potential unknown words that the user might need additional help with based on the user's reading capability level as stored in the user profile. The potential unknown words are words that the user potentially will not know the translation for or what the word means in the context of the sentence or paragraph. In an embodiment, smart reading assistant program 112 inputs "in context meanings" for each potential unknown word, i.e., a correct meaning, definition, translation, or usage of the word based on the context of the sentence or paragraph. In an embodiment, responsive to identifying the user's reading capability level for the language, smart reading assistant program 112 inputs, directly in line with text, in context meanings of potential unknown words based on the user's reading capability level.

In general, as the user clicks to each page in the e-book, smart reading assistant program 112 inputs, directly in line with the text of the page, in context meanings for each potential unknown words based on the user's reading capability level. Also, the lower the user's reading capability level (i.e., the less proficient the user is at reading in the language), the more potential unknown words smart reading assistant program 112 will input meanings for.

In step 340, smart reading assistant program 112 detects a user action. In an embodiment, smart reading assistant program 112 detects a user action by the user. A user action can include clicking on a word to enable a meaning, clicking on a word to disable a meaning, pausing over a sentence and/or paragraph for more than a pre-defined threshold of time, and rereading a sentence and/or paragraph more than a pre-defined threshold number of times. In an embodiment, responsive to the user clicking on a word to enable a meaning, smart reading assistant program 112 provides a meaning for the word. In an embodiment in which there is a word that smart reading assistant program 112 has not enabled (i.e., input or provided) a meaning for and the user has clicked on the word to enable a meaning to be provided, smart reading assistant program 112 provides the in context meaning of the word. By clicking on the word to enable a meaning, the user has indicated that they are not proficient in that word and its usage.

In an embodiment, responsive to the user clicking on a word to disable the meaning, smart reading assistant program 112 removes the meaning from the text and updates the user's reading capability level to note that the user knows the word within that context. If the word the user clicked on to disable the meaning is being used in one context, but the word has multiple meanings in different contexts, smart reading assistant program 112 still provides in context meanings for the word when used in the other contexts at any other point in the e-book, but does not provide the meaning of the word at any other point in the e-book when used in the same context as the context in which the user clicked on the word to disable the meaning. The user can also disable the meaning of an open word which indicates that the user is learning new words and more proficient in that word and its usage. Smart reading assistant program 112 will remove the meaning of this word in the existing and the further pages and will include this into the AI system to calculate the new level of the user's reading capability.

In an embodiment, responsive to the user pausing over a sentence and/or paragraph for more than a pre-defined threshold of time or rereading a sentence and/or paragraph more than a pre-defined threshold number of times, smart reading assistant program 112 provides a meaning for at least one word within the sentence or paragraph that, based on the user's reading capability level, smart reading assistant program 112 determines the user is most likely having difficulty with. In these embodiments, smart reading assistant program 112 uses eye tracking or gaze tracking technology as known in the art to determine when the user pauses or rereads a section of text on the page being displayed on the computing device. In some embodiments, smart reading assistant program 112 prompts the user to input word(s) from the sentence or paragraph that the user is unsure of the meaning of. In other embodiments, smart reading assistant program 112 provides an in context meaning, in line with the text, for each word that smart reading assistant program 112 determines the user is most likely having difficulty with (i.e., unsure of the meaning or usage of the word).

In some embodiments, smart reading assistant program 112 determines a reading pace of the user based on a length of time the user spends on each page, a reading pace of the user from a previous e-book, or a standard reading pace if the user is reading an e-book for the first time on the e-reader device. The reading pace of the user can be used by smart reading assistant program 112 in combination with eye tracking to determine whether the user has paused for longer than a pre-defined length of time, indicating the user is stuck and needs help to read a certain section identified based on the eye tracking.

In step 350, smart reading assistant program 112 updates the user's reading capability level based on the user action. In an embodiment, responsive to detecting the user action and taking an action, smart reading assistant program 112 updates the user's reading capability level to reflect the user action and action taken by smart reading assistant program 112. In an embodiment, responsive to the user enabling a meaning of a word, smart reading assistant program 112 updates the user's reading capability level to reflect that the user is not proficient in the word and its usage in the context of the sentence or paragraph. In an embodiment, responsive to the user disabling a meaning of a word, smart reading assistant program 112 updates the user's reading capability level to reflect that the user is proficient in the word and its usage in the context of the sentence or paragraph. If the word the user disabled the meaning for has multiple meanings for different contexts, smart reading assistant program 112 will still input the other meanings for the word in the different contexts. In an embodiment, responsive to enabling meanings for at least one word based on the user pausing or rereading a section, smart reading assistant program 112 updates the user's reading capability level to reflect that the user is not proficient in the word(s) and their usage in the context of the sentence or paragraph.

In step 360, smart reading assistant program 112 identifies related words using collocation extraction. In an embodiment, smart reading assistant program 112 identifies related words to the word(s) that smart reading assistant program 112 enabled a meaning for responsive to a user action by using collocation extraction. In an embodiment, smart reading assistant program 112 identifies related words to the word that smart reading assistant program 112 believes the user needs help to learn or the word clicked on by the user to enable a meaning for that word. Collocation extraction is a feature that seeks to further advance the learning of the user by suggesting words to the user related to the word selected that are in the same context but potentially new to the user. The idea is that whilst the related words are in that context, it's an ideal opportunity to further expand the user's vocabulary into potentially new areas.

Smart reading assistant program 112 identifies related words using collocation extraction to create a "bucket of words" (i.e., grouping of related words based on the context) that are similar in context to the word, so that smart reading assistant program 112 can help the user learn related words that are similar in context to the word the user has indicated they need more help with. In an embodiment, smart reading assistant program 112 represents the "bucket of words" by set theoretic mathematics to classify the words by type of word, language difficulty, etc. Using set theoretic mathematics, smart reading assistant program 112 generates a lattice mathematical function for the "bucket of words". Smart reading assistant program 112 is primed with data from dictionary and thesaurus sources to classify words that are spelt the same by context/meaning. Smart reading assistant program 112 uses further external data sources to identify words that are also typically found or related to the one selected in that same context to create the algebraic lattice.

Figure 4:
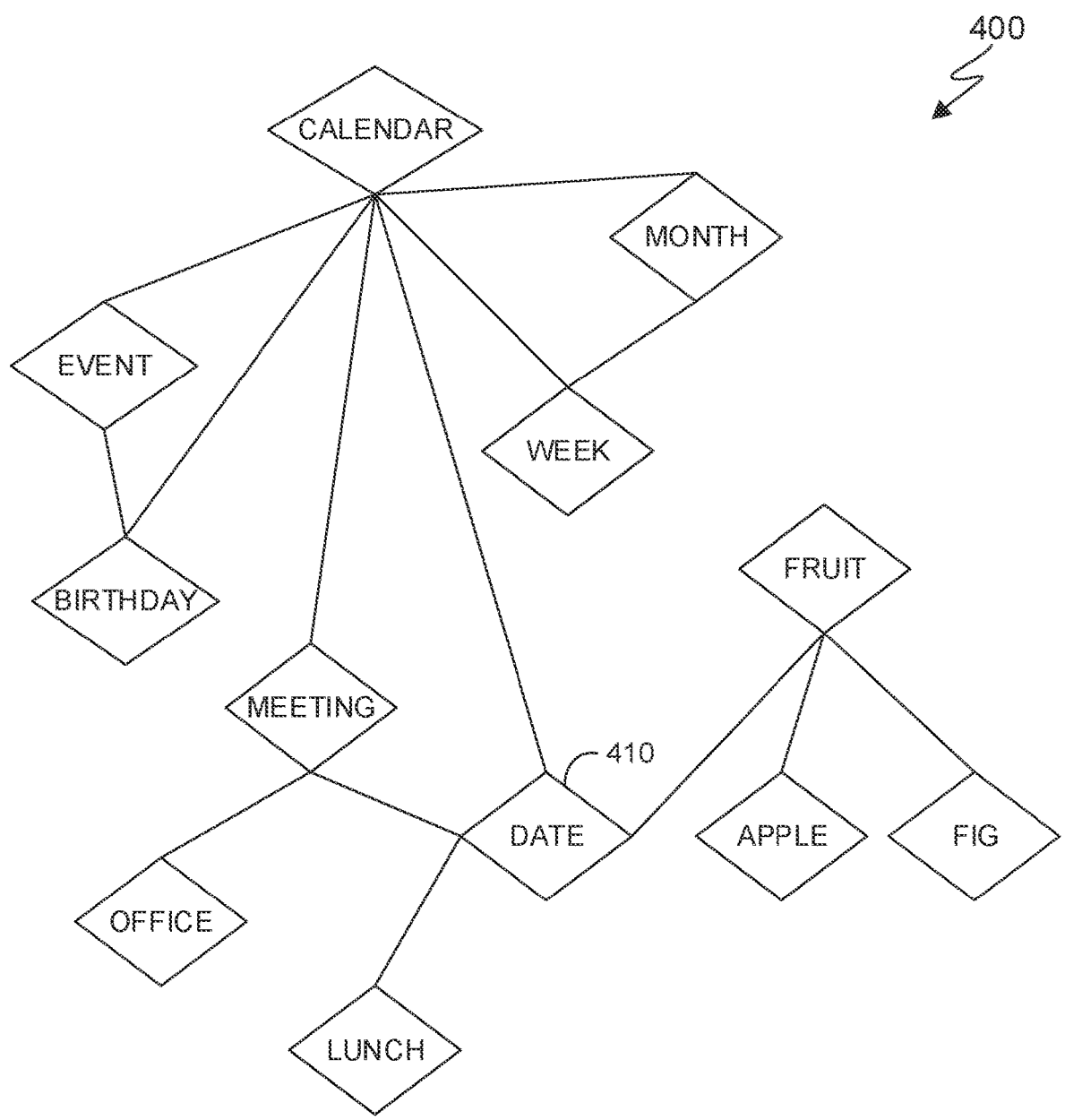
FIG. 4 depicts an exemplary algebraic lattice generated by the smart reading assistant program, in accordance with an embodiment of the present invention.

FIG. 4 depicts exemplary algebraic lattice 400 generated by the smart reading assistant program, in accordance with an embodiment of the present invention. FIG. 4 depicts several "buckets of words" stemming for the word "date" 410. A first bucket for the word "date" includes the words "calendar", "month", "week", "event", and "birthday". A second bucket for the word "date" includes the words "meeting", "office", and "lunch". A third bucket for the word "date" includes the words "fruit", "apple", and "fig".

For example, a user, whose native language is Italian, is reading a book in English and comes across the word "date" within the sentence "I've never had dates on a pizza before". The user clicks on the word date to enable a meaning to be input into the text. Smart reading assistant program 112 determines the context of the word "date" in the sentence as referring to "date" as a fruit and provides that meaning of the word "date" in the text. Smart reading assistant program 112 also creates a "bucket of words" related to the word "date" in its different contexts, as shown in FIG. 4. Smart reading assistant program 112 uses the algebraic lattice and "bucket of words" to determine related words that the user might not know the in context meaning of throughout the e-book. In some embodiments, smart reading assistant program 112 outputs a learning activity to the user through a user interface on the computing device the user is reading the e-book based on the related words identified from the "bucket of words". The learning activity can use the "bucket of words", which includes related words throughout the book, to help the user learn related words used in a similar context.

Referring back to FIG. 3, in step 370, responsive to the user opening a page of the e-book with at least one of the related words, smart reading assistant program 112 inputs, directly in line with text, an in context meaning of the at least one related word. In general, as the user clicks to each page in the e-book, smart reading assistant program 112 inputs, directly in line with the text of the page, in context meanings for each potential unknown words based on the user's reading capability level, which is updated by smart reading assistant program 112 based on user actions as they occur. Based on the user enabling/disabling a meaning for an additional unknown word in the step 340, or using the eye tracking or gaze tracking technology as known in the art to determine when the user pauses or rereads a section of text on the page being displayed on the computing device, smart reading assistant program 112 identifying related words to the word involved in the user action and inputs meanings for any of the related words as they are identified in the text on a page the user is currently viewing. In an embodiment, smart reading assistant program 112 suggests related words from the same "bucket of words" and within the same context as the enabled word to have the meanings input into the text.

As highlighted, this Figure illustrates one possible iteration of smart reading assistant program 112. The steps 340-370 can be iterative an occur in loops as the user reads the digital book.

Figure 5:
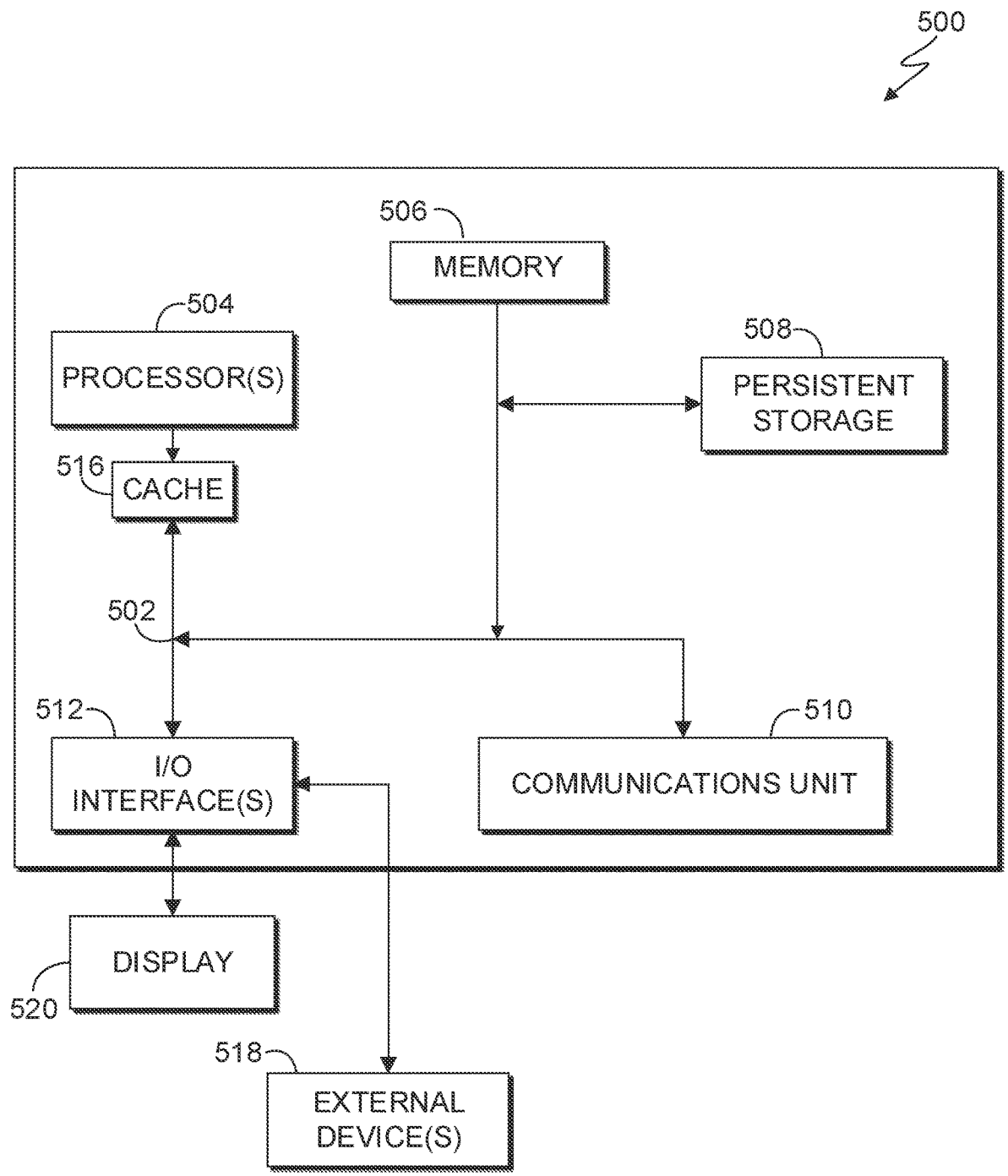
FIG. 5 depicts a block diagram of components of a computing device of the distributed data processing environment of FIG. 1, in accordance with an embodiment of the present invention.

FIG. 5 depicts a block diagram of components of computing device 500, suitable for server 110 and/or user computing device 120 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs may be downloaded to persistent storage 508 through communications unit 510.

I/O interface(s) 512 allows for input and output of data with other devices that may be connected to server 110 and/or user computing device 120. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for a smart reading assistant, the computer-implemented method comprising:
    detecting, by one or more processors, a language of a digital book opening by a user on a computing device;
    identifying, by the one or more processors, a user reading capability level for the language of the digital book from a user profile for the user;

inputting, by the one or more processors, at least one in context meaning of potential unknown words based on the user reading capability level;

detecting, by the one or more processors, a user action by the user on the computing device, wherein the user action includes the user rereading a sentence of a current page, wherein eye tracking technology is used to detect the user action;

outputting, by the one or more processors, a request that prompts the user to input words from the sentence;

receiving, by the one or more processors, a response to the request, wherein the response includes a plurality of indicated words;

inputting, by the one or more processors, at least one in context meaning for each of the indicated words; and updating, by the one or more processors, the user reading capability level based on the user action.

2. The computer-implemented method of claim 1, further comprising:

requesting, by the one or more processors, a native language and reading capability level for one or more foreign languages from the user;

receiving, by the one or more processors, the native language and the reading capability level for the one or more foreign languages from the user; and storing, by the one or more processors, the native language and the reading capability level for the one or more foreign languages in the user profile.

3. The computer-implemented method of claim 1, further comprising:

identifying, by the one or more processors, using collocation extraction, related words to a word involved in the user action; and inputting, by the one or more processors, at least one in context meaning of at least one of the related words, wherein identifying, using collocation extraction, the related words to the word involved in the user action comprises:

creating, by the one or more processors, buckets of words that are related to the word for different contexts using an algebraic lattice; and identifying, by the one or more processors, from the buckets of words, the related words that are in a same context as the word.

4. The computer-implemented method of claim 1, further comprising:

identifying, by the one or more processors, using collocation extraction, related words to a word involved in the user action; and inputting, by the one or more processors, at least one in context meaning of at least one of the related words, wherein the at least one in context meaning of potential unknown words and of the at least one of the related words is input in line with text of a current page of the digital book displayed on the computing device.

5. The computer-implemented method of claim 1, further comprising:

identifying, by the one or more processors, using collocation extraction, related words to a word involved in the user action;

inputting, by the one or more processors, at least one in context meaning of at least one of the related words; and outputting, by the one or more processors, a learning activity to the user through a user interface of the computing device based on the related words.

6. The computer-implemented method of claim 1, further comprising: determining a reading pace of the user based on a previous reading by the user of another digital book, wherein the determined reading pace of the user is used in combination with the eye tracking technology to detect the user action.

7. The computer-implemented method of claim 1, further comprising:

identifying, by the one or more processors, using collocation extraction, related words to a word involved in the user action; and inputting, by the one or more processors, at least one in context meaning of at least one of the related words.

8. The computer computer-implemented method of claim 1, further comprising: outputting, by the one or more processors, a feature that that enables the user to input, on the computing device, previous reading experience of the user.

9. The computer-implemented method of claim 8, further comprising: receiving, by the one or more processors, a user input that specifies the previous reading experience of the user.

10. A computer program product for a smart reading assistant, the computer program product comprising:

one or more computer readable storage media and program instructions collectively stored on the one or more computer readable storage media, the stored program instructions comprising:

program instructions to detect a language of a digital book opening by a user on a computing device;

program instructions to identify a user reading capability level for the language of the digital book from a user profile for the user;

program instructions to input at least one in context meaning of potential unknown words based on the user reading capability level;

program instructions to detect a user action by the user on the computing device, wherein the user action includes the user rereading a sentence of a current page more than a pre-defined threshold amount of times, wherein eye tracking technology is used to detect the user action;

output a request that prompts the user to input words from the sentence;

receive a response to the request, wherein the response includes a plurality of indicated words;

program instructions to input at least one in context meaning for each of the indicated words;

program instructions to update the user reading capability level based on the user action;

program instructions to identify, using collocation extraction, related words to a word involved in the user action; and program instructions to input at least one in context meaning of at least one of the related words.

11. The computer program product of claim 10, further comprising:

program instructions to request a native language and reading capability level for one or more foreign languages from the user;

program instructions to receive the native language and the reading capability level for the one or more foreign languages from the user; and program instructions to store the native language and the reading capability level for the one or more foreign languages in the user profile.

12. The computer program product of claim 10, wherein the program instructions to identify, using collocation extraction, the related words to the word involved in the user action comprise:
   program instructions to create buckets of words that are related to the word for different contexts using an algebraic lattice; and
   program instructions to identify, from the buckets of words, the related words that are in a same context as the word.

13. The computer program product of claim 10, wherein the at least one in context meaning of potential unknown words and of the at least one of the related words is input in line with text of a current page of the digital book displayed on the computing device.

14. The computer program product of claim 10, further comprising:
   program instructions to output a learning activity to the user through a user interface of the computing device based on the related words.

15. A computer system for a smart reading assistant, the computer system comprising:
   one or more computer processors;
   one or more computer readable storage media;
   program instructions collectively stored on the one or more computer readable storage media for execution by at least one of the one or more computer processors, the stored program instructions comprising:
   program instructions to detect a language of a digital book opening by a user on a computing device;
   program instructions to output a feature that that enables the user to input, on the computing device, previous reading experience of the user;
   program instructions to receive, from the computing device, a user input that specifies the previous reading experience of the user, the user input including: a first number of writings previously read by the user in a native language of the user and a second number of writings previously read by the user in a foreign language;
   program instructions to determine a user reading capability level for the language of the digital book, wherein the user reading capability level is determined based on the specified first number and the specified second number of the received user input;
   program instructions to input at least one in context meaning of potential unknown words based on the user reading capability level;
   program instructions to detect a user action by the user on the computing device;
   program instructions to update the user reading capability level based on the user action;
   program instructions to identify, using collocation extraction, related words to a word involved in the user action; and
   program instructions to input at least one in context meaning of at least one of the related words.

16. The computer system of claim 15, wherein the user action includes the user rereading a sentence of a current page more than a pre-defined threshold amount of times.

17. The computer system of claim 16, wherein eye tracking technology is used to detect the user action.

18. The computer system of claim 15, wherein the program instructions to identify, using collocation extraction, the related words to the word involved in the user action comprise:
   program instructions to create buckets of words that are related to the word for different contexts using an algebraic lattice; and
   program instructions to identify, from the buckets of words, the related words that are in a same context as the word.

19. The computer system of claim 15, wherein the at least one in context meaning of potential unknown words and of the at least one of the related words is input in line with text of a current page of the digital book displayed on the computing device.

* * * * *